United States Patent [19]

Oppenhuisen et al.

[11] Patent Number: 4,519,192

[45] Date of Patent: May 28, 1985

[54] HOLD-DOWN SICKLE GUARD

[75] Inventors: Fred H. Oppenhuisen; Frank O. Allee, both of Buchanan, Mich.

[73] Assignee: National-Standard Company, Niles, Mich.

[21] Appl. No.: 586,066

[22] Filed: Mar. 5, 1984

[51] Int. Cl.³ .............................................. A01D 55/08
[52] U.S. Cl. ...................................... 56/298; 56/305; 56/308
[58] Field of Search .......................... 56/305, 298, 308

[56] References Cited

U.S. PATENT DOCUMENTS

| 10,990 | 3/1889 | Fox | 56/305 |
|---|---|---|---|
| 273,082 | 2/1883 | Hopkins | 56/305 |
| 723,397 | 3/1903 | Latimer | 56/305 |
| 3,401,512 | 9/1968 | Pool et al. | 56/298 |

Primary Examiner—Jay N. Eskovitz
Attorney, Agent, or Firm—Emrich & Dithmar

[57] ABSTRACT

In a crop cutting apparatus having a cutterbar and attached sickle sections, an integrated hold-down sickle guard protects the sickle sections from damage and maintains them in proper spaced relation relative to complementary cutting edges for optimum cutting action. The hold-down sickle guard eliminates the need for separate sickle section hold-down plates positioned along the length of the cutterbar and provides a sickle section retaining arrangement of increased strength for every sickle section permitting the linearly arranged, coupled reciprocating sickle sections to be held in close cutting cooperation with associated complementary cutting edges along the entire width of the cutterbar. The hold-down sickle guard includes integral upper and lower sections with a generally horizontal slot located therebetween within which a sickle section is movably positioned. In one embodiment, the upper portions of adjacent sickle guard assemblies are securely joined by a tie bar for increased sickle guard strength, while in another embodiment the upper portion of each sickle guard assembly includes a turned down portion which contacts an adjacent sickle section and maintains it in close cutting cooperation with the lower portion of the sickle guard.

10 Claims, 9 Drawing Figures

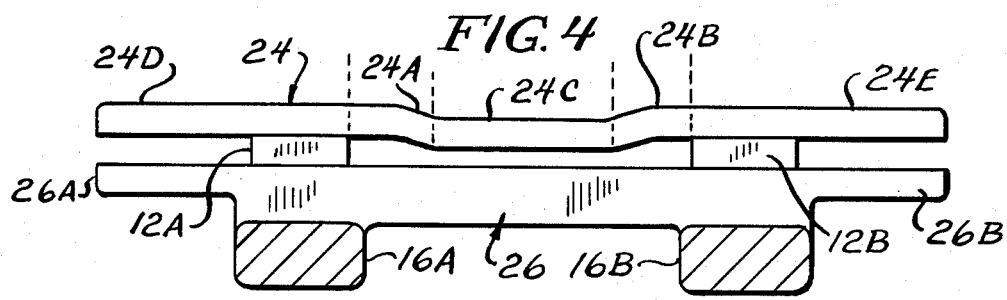
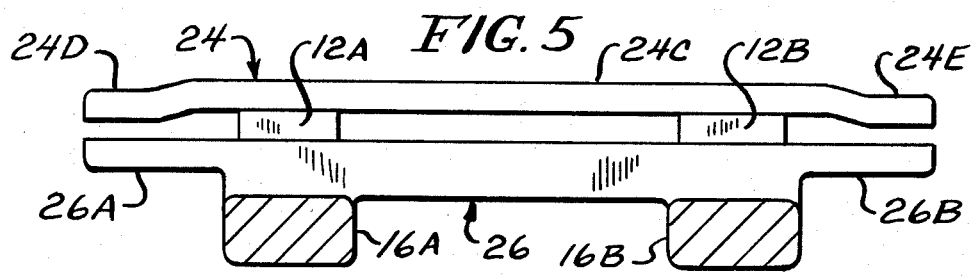
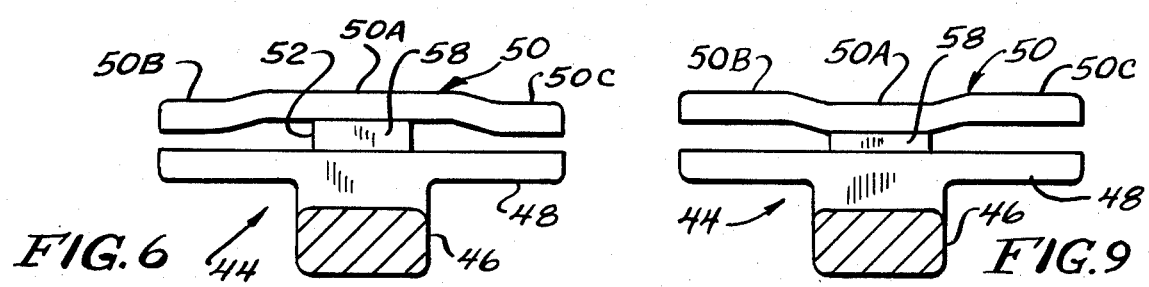
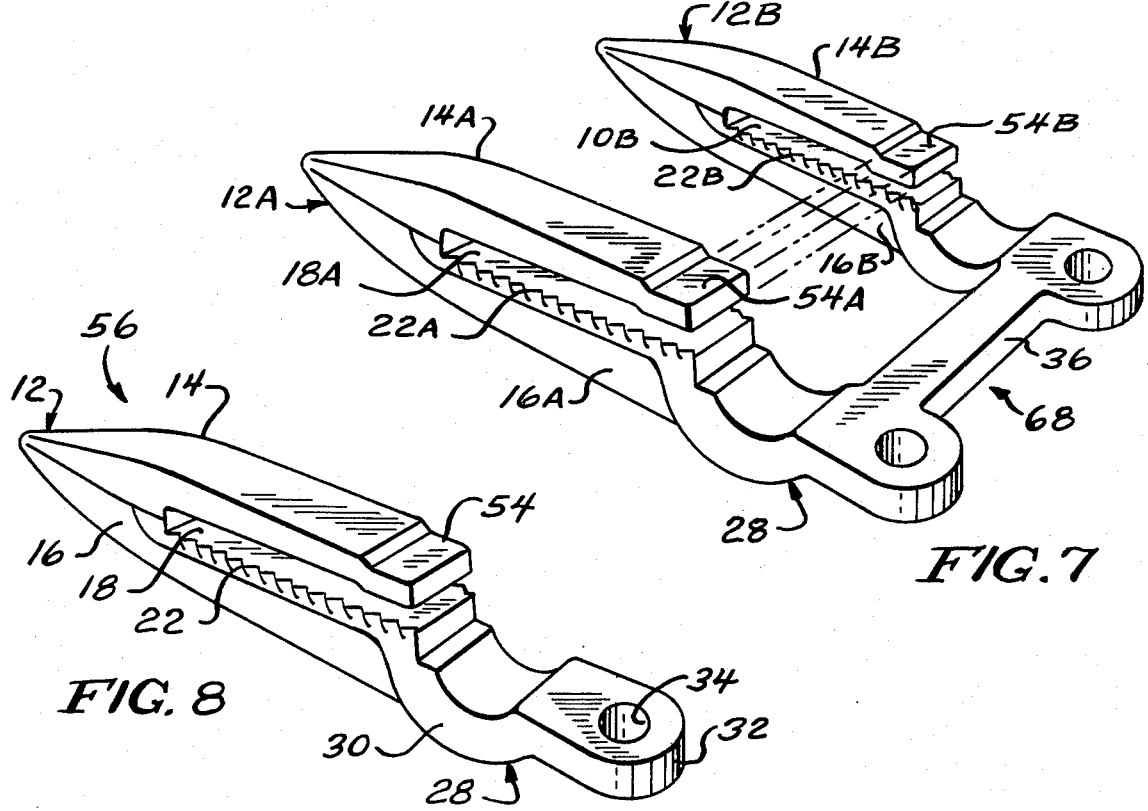

HOLD-DOWN SICKLE GUARD

BACKGROUND OF THE INVENTION

The present invention relates generally to crop cutting implements and is particularly directed to an arrangement for improving cutting efficiency in a crop cutting implement and protecting the cutting mechanism from damage.

The cutting mechanism of a row-crop head, such as in a grain or soybeam combine, or in hay mowing equiment is generally based on a scissors action between a sickle bar and attached sickle sections which are displaced horizontally in a reciprocating manner through a horizontal slot in a sickle guard to sever the hay or grain stalk. The horizontal slot or gap confines and defines the path of travel of the reciprocating sickle sections and provides cutting action between the reciprocating sickle sections and the upper surface of the lower sickle guard member. In the past, a separate hold-down plate has been attached at various points along the width of the sickle bar to hold the sickle sections down against the upper surface cutting edges of the lower sickle guard member. In this type of sickle guard arangement, the wear and abrasion which occurs between the reciprocating sickle sections and the upper and lower guard members during usage results in an increase in the depth of the gap or horizontal slot between the upper and lower guard members. Thus, if these hold-down plates, or the upper guard members, are not kept properly adjusted, the sickle sections tend to ride up away from the upper surface cutting edge of the lower sickle guard member thereby permitting the hay or grain stalks to slide under the sickle sections. This action results in reduced cutting efficiency and clogging of hay or lower grain yield. In addition, the increased displacement between the reciprocating sickle sections and the sickle guard edges increases the likelihood of the reciprocating sickle sections catching the upper lip of the sickle guard and breaking it off. Similarly, this increased displacement also increases the possibility of a foreign object such as a stone becoming lodged between these cutting surfaces and damaging them.

In the past, attempts were made to avoid these problems by either reducing the speed of the cutting implement or by periodically checking the alignment of the complementary cutting surfaces and reconfiguring the individual sickle guards or the hold down plates such as by means of a hammer where necessary. More often, this cutting edge misalignment was merely ignored and the farmer realized reduced crop yields.

In the case of soybeans, the major cause of shattering loss, which accounts for approximately 28% of all harvesting losses, is the jolt caused by the impact of the sickle blade with the soybean stalk. Shattering causes the beans to be knocked out of the pods and onto the ground where they remain unharvested. With crop losses ranging up to 5-6 bushels per acre and a portion of these losses due to shattering, the need for an improved means for severing and gathering the crop in the field is readily apparent.

The present invention is intended to provide such an improved means for cutting crops and reducing crop losses. This is accomplished in the present invention by maintaining the cutting edges in a multi-section sickle assembly in proper spaced relation for insuring optimum cutting action while protecting the reciprocating sickle sections from damage.

OBJECTS OF THE INVENTION

Accordingly, it is an object of the present invention to improve cutting efficiency in a crop cutting implement and reduce crop losses which occur during harvesting.

Another object of the present invention is to provide improved protection from impact damage for a sickle assembly while maintaining proper alignment of the cutting edges in a crop cutting mechanism.

Yet another object of the present invention is to provide a sickle guard of increased strength and durability.

A further object of the present invention is to provide a high strength sickle guard assembly which predeterminedly maintains the cutting edges in proper spaced relation without the need for periodic and regular adjustments.

A still further object of the present invention is to reduce the susceptibility to foreign object damage in a crop cutting mechanism having a plurality of reciprocating sickle sections.

These and other objects of the present invention are accomplished by an integrated sickle guard/hold-down assembly which includes, in one embodiment, a pair of longitudinally extending guard tines, or prongs, each of which includes facing upper and lower guard sections. Each pair of upper and lower guard sections are securely coupled together at a forward portion thereof so as to form an integrated assembly which includes a horizontal slot or gap having a cutting surface thereon positioned between the upper and lower guard sections and within which a sickle section is movably positioned for horizontal displacement in a reciprocating manner during operation. A hold-down bar is mounted between aft portions of adjacent upper guard sections and is configured so as to contact an upper portion of an immediately adjacent sickle section. The sickle section is thus maintained in proper cutting position relative to the complementary cutting edges on an upper cutting surface portion of the lower guard section. Each lower guard section includes an aft portion which is adapted to be securely mounted to a common bar of a cutting implement, with the aft portions of adjacent lower guard sections joined by a rigid crossbar. A trash bar attached to adjacent lower guard sections immediately below the hold-down bar, with a sickle section positioned therebetween, further strengthens the sickle guard/hold-down assembly while reducing the likelihood of damage caused by a foreign object becoming lodged between the facing cutting edges.

In another embodiment, downward displacement of the sickle sections in providing close positioning with the cutting edges of adjacent lower guard sections for optimum cutting action is provided by downward turned edges on an aft portion of each upper guard section.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 4 is a sectional view corresponding to the sectional view of FIG. 3 of another embodiment of the hold-down sickle guard of the present invention;

FIG. 5 is a sectional view corresponding to that shown in FIG. 3 of yet another embodiment of the hold-down sickle guard of the present invention;

FIG. 6 is a sectional view corresponding to that of FIG. 3 wherein is shown a hold-down sickle guard having a single longitudinally extending guard tine in accordance with the present invention;

FIG. 7 is an upper perspective view of another embodiment of a hold-down sickle guard in accordance with the present invention; and FIG. 8 is an upper perspective view of another embodiment of a hold-down sickle guard having a single longitudinally extending tine in accordance with the present invention; and FIG. 9 is a sectional view corresponding to that of FIG. 3 wherein is shown a hold-down sickle guard having a single longitudinally extending guard tine in accordance with the present invention;

DESCRIPTION OF THE PREFERRED EMBODIMENT

Figure 1:
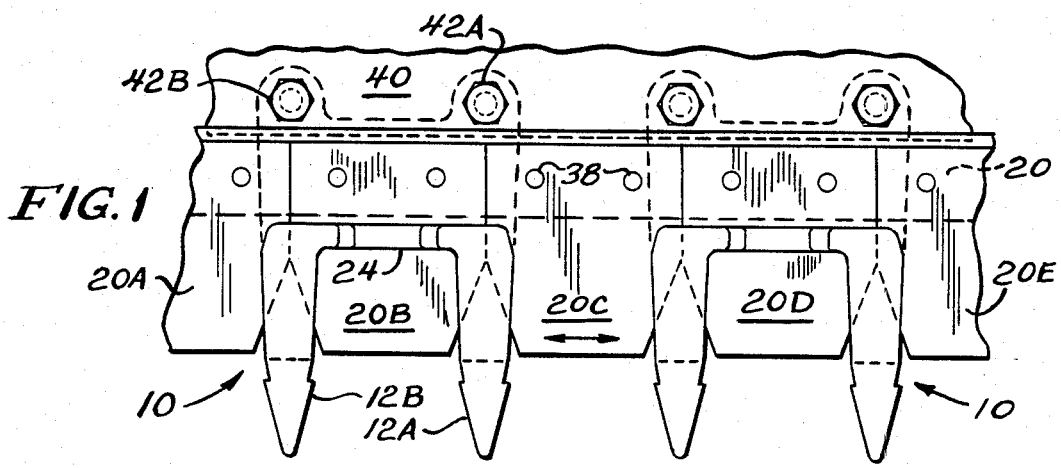
FIG. 1 is a partially cutaway top plan view of a pair of adjacently positioned hold-down sickle guards mounted on a common bar of a crop cutting implement in accordance with the present invention.

Referring to FIG. 1, there is shown a top plan view of a pair of hold-down sickle guards 10 in accordance with the present invention mounted to a common bar 40 of a conventional cutting implement, such as a mower or combine. The hold-down sickle guard 10 is further shown in an upper perspective view in FIG. 2.

Figure 2:
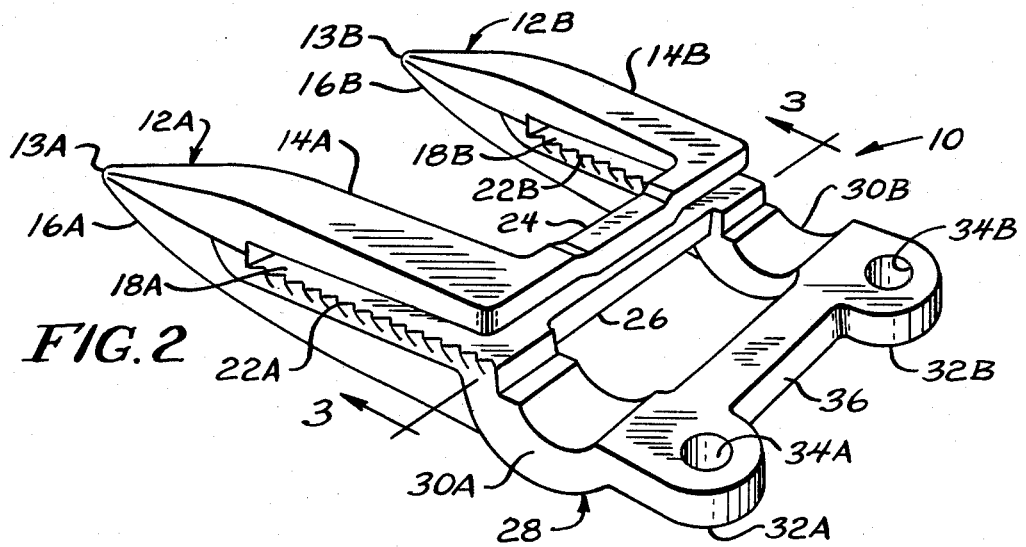
FIG. 2 is an upper perspective view of a hold-down sickle guard in accordance with the present invention.

Referring to FIGS. 1 and 2, the hold-down sickle guard 10 includes left and right horizontally spaced-apart, longitudinally extending guard tines 12A, 12B which are tapered toward the forward ends 13A, 13B thereof. An aft portion of each of the left and right guard tines 12A, 12B includes a respective recessed portion 30A, 30B which are adapted to receive a cutter-bar, or sickle bar, 20 to which a plurality of sickle sections 20A, 20B, 20C, 20D and 20E are mounted by means of rivets, nuts or bolts 38, as is well known in the art.

Each of the sickle sections 20A, 20B, 20C, 20D and 20E are firmly attached to the sickle bar 20 and are designed to reciprocally cooperate with an upper ledger or cutting surface 22A, 22B on a respective lower body section 16A, 16B of each guard tine. The rear end portions of each of left and right recessed portions 30A, 30B includes a respective mounting flange 32A, 32B within which is positioned a respective mounting aperture 34A, 34B. The respective combinations of mounting flanges and mounting apertures are adapted to cooperate with bolts or other fastening means 42A, 42B to firmly mount the hold-down sickle guard 10 to the frame or common bar 40 of a conventional cutting implement (not shown).

Each of the left and the right guard tines 12A, 12B includes a respective upper body section 14A, 14B as well as a corresponding lower body section 16A, 16B. A pair of respective upper and lower body sections are securely coupled at the respective forward ends thereof so as to form a unitary hold-down sickle guard 10. The aft portions of the upper and lower body sections of guard tines 12A, 12B are in spaced relation with respect to one another so as to define a pair of horizontal slots 18A, 18B therebetween. With a cutter bar 20 positioned within the left and right recessed portions 30A, 30B or the rear end portion of the lower body sections 16A, 16B and with adjacent sickle sections positioned within aligned horizontal slots 18A, 18B, the sickle assembly is free to move horizontally in a reciprocating manner. The respective, upper and lower body sections 14A, 14B and 16A, 16B cooperate with reciprocating sickle sections positioned therebetween to retain the same in cutting relationship with the upper cutting surfaces 22A, 22B of the respective lower body sections 16A, 16B. As shown in FIG. 2, the lateral edges of the right and left upper ledgers, or cutting surfaces 22A, 22B may take on various forms for various cutting applications and are shown as serrated in FIG. 2. Upon the firm attachment of left and right guard tines 12A, 12B and mounting clip 38 to the frame or common bar 40 by inserting the tightening fastening means 42A, 42B through apertures therein, the upper cutting surfaces of the lower body sections 16A, 16B are drawn into firm contact with a respective, adjacent sickle section.

The hold-down sickle guard 10 includes a crossbar 36 securely coupled to adjacent left and right mounting flanges 32A, 32B in the rear end portion 28 thereof. Similarly, intermediate portions of the left and right lower body sections 16A, 16B of the hold down sickle guard 10 are securely connected by means of a trash bar 26. Crossbar 36 and trash bar 26 in a preferred embodiment are forged as a single unit with the left and right guide tines 12A, 12B and provide a structurally strong hold-down sickle guard assembly. In addition, trash bar 26 prevents trash from becoming lodged between the cutting surfaces of the hold-down sickle guard 10 and the immediately adjacent sickle sections for improved cutting action therebetween. This arrangement reduces also the possibility of damage to the cutting implement caused by foreign object impact or debris becoming wedged between the cutting surfaces.

Figure 3:
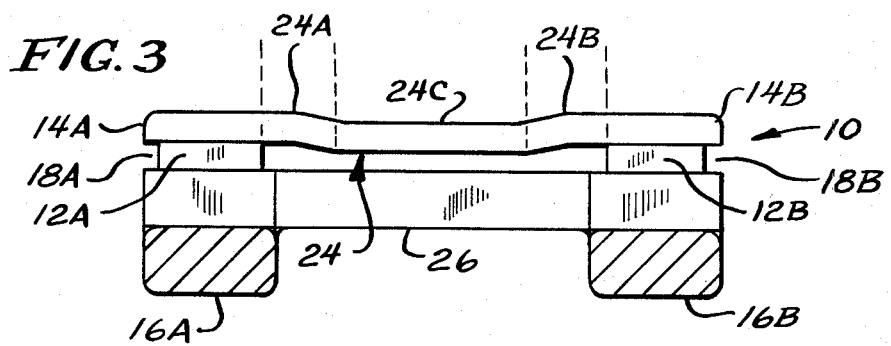
FIG. 3 is a sectional view of the hold-down sickle guard shown in FIG. 2 taken along sight line 3—3 therein.

Coupled to aft portions of adjacent left and right upper body sections 14A, 14B is a hold-down, or tie, bar 24. As shown in FIG. 3, which is a sectional view taken along sight line 3—3 of FIG. 2, hold-down bar 24 includes left and right angled portions 24A, 24B which are coupled to an integral with respective left and right upper body sections 14A, 14B of the left and right guard tines 12A, 12B. Coupled to each of the left and the right angled portions 24A, 24B and integral therewith is a center section 24C of the hold-down bar 24. Center section 24C extends toward trash bar 26 and with sickle sections positioned within horizontal slots 18A, 18B and between center section 24C and trash bar 26, the center section 24C of the hold-down bar 24 abuts an upper surface of the sickle sections causing the lower surfaces thereof to be positioned in close proximity to the left and right upper ledgers, or cutting surfaces, 22A, 22B. Thus, the center section 24C of the hold-down bar 24, by displacing the sickle sections downward toward the lower body sections 16A, 16B, maintains the facing cutting surfaces in intimate contact with each other thus insuring optimum cutting action in the hold-down sickle guard 10 of the present invention.

Referring to FIG. 4, there is shown a sectional view corresponding to that of FIG. 3 wherein is shown another embodiment of the present invention. In the embodiment shown in FIG. 4, the hold-down bar 24 not only includes left and right angled portions 24A, 24B and center section 24C, but also includes left and right outer sections 24D, 24E which respectively extend beyond left and right guard tines 12A, 12B. Similarly, trash bar 26 includes left and right outer trash bar sections 26A, 26B which also respectively extend out beyond left and right guard tines 12A, 12B. In the embodiment shown in FIG. 4, it is the center section 24C of the hold-down bar 24 which abuts and displaces downward immediately adjacent sickle sections in order to maintain optimum cutting action between these sickle sections and the upper ledgers or cutting surfaces of the left and right lower body sections 16A, 16B. With the left and right hold-down bar outer sections 24D, 24E positioned adjacent respective left and right outer trash bar sections 26A, 26B, trash and potentially damaging foreign objects are prevented from becoming wedged between the sickle sections and immediately adjacent portions of the hold-down sickle guard for more efficient cutting action, increased crop recovery and more reliable cutting implement operation.

Referring to FIG. 5, there is shown a sectional view similar to that of FIGS. 3 and 4 wherein is illustrated yet another embodiment of the present invention. In the embodiment of FIG. 5, the left and the right outer sections 24D, 24E of the hold-down bar 24 are displaced downward toward the respective immediately adjacent left and right outer trash bar sections 26A, 26B. In this embodiment, center section 24C of the hold-down bar 24 is generally parallel to the upper, immediately adjacent surface of the trash bar 26 and does not generally abut an upper surface of sickle sections positioned therebetween. Outer sections 24D, 24E of the hold-down bar 24 abut upper portions of respective sickle sections positioned immediately adjacent thereto and maintain these sickle sections in close cooperation with the cutting surfaces of the left and right lower body sections 16A, 16B.

Referring to FIG. 6, there is shown a single tine hold-down sickle guard 44 in accordance with yet another embodiment of the present invention. The single tine hold-down sickle guard 44 is comprised of a single, integral piece which includes a single, longitudinally extending guard tine 58, a hold-down bar 50, a lower body section 46, and a trash bar 48. In this embodiment, the hold-down bar 50 includes a center section 50A coupled to and integral with guard tine 58 and left and right outer sections 50B, 50C. The left and right outer sections 50B, 50C are displaced downward toward trash bar 48 for engaging and displacing downward immediately adjacent sickle sections. In this manner, the lower cutting edges of the sickle sections are maintained in position immediately adjacent the corresponding cutting surfaces of lower body section 46.

Referring to FIG. 7, there is shown yet another embodiment of a hold-down sickle guard 68 in accordance with the principles of the present invention. In this arrangement, the left and right guard tines 12A, 12B are coupled only by means of crossbar 36 which forms an integral portion of the rear end portion 28 of the hold-down sickle guard 68. Aft portions of left and right upper body sections 14A, 14B of left and right guard tines 12A, 12B are provided with respective recessed, or notched, portions 54A, 54B. Recessed portions 54A, 54B are displaced downward toward respective lower body sections 16A, 16B of a guard tine. These recessed portions thus abut an upper portion of the sickle sections positioned within horizontal slots 18A and 18B and ensure that the cutting surfaces of these sickle sections are maintained in close proximity to the cutting surfaces 22A, 22B of respective lower body sections 16A, 16B. It is in this manner that optimum cutting action is maintained in the hold-down sickle guard 68 of FIG. 7.

Referring to FIG. 8, there is shown a single tine sickle guard 56 having an upper body section 14 which includes a notched portion 54 on an aft end thereof in accordance with the present invention. Notched portion 54 operates in a manner similar to the previously mentioned notched portions with reference to FIG. 7 in displacing downward an immediately adjacent sickle section to ensure optimum cutting action between the sickle section and the upper cutting surface 22 of the lower body section 16 of guard tine 12.

Referring now to FIG. 9, there is shown a single tine hold-down sickle guard 44 in accordance with still another embodiment of the present invention. The single tine hold-down sickle guard 44 is comprised of a single, integral piece which includes a single, longitudinally extending guard tine 58, a hold-down bar 50, a lower body section 46, and a trash bar 48. In this embodiment, the hold-down bar 50 includes a center section 50A coupled to and integral with guard tine 58 and left and right outer sections 50B, 50C. The left and right outer sections, 50B, 50C are displaced outward away from trash bar 48 and the center section 50A is displaced downward toward trash bar 48 for engaging and displacing downward immediately adjacent sickle sections. In this manner, the lower cutting edges of the sickle sections are maintained in position immediately adjacent the corresponding cutting surfaces of lower body section 46, as has been described.

There has thus been shown a sickle guard which includes a sickle section hold-down arrangement which permits all of the sickle sections to be held down in optimum cutting position across the entire width of a cutting implement. In addition, the hold-down mechanism of the present invention is integral with the sickle guard and thus provides a sickle section retaining force of increased strength. This makes it less likely for a sickle section to ride up off of the cutting edge and provides more efficient cutting operation and increased crop recovery. In addition, the present invention provides increased protection against cutting implement damage caused by a foreign object or stone impact.

While particular embodiments of the present invention have been shown and described, it will be obvious to those skilled in the art that changes and modifications may be made without departing from the invention in its broader aspects. For example, while the hold-down sickle guard of the present invention has been shown as including one or two longitudinally extending guard tines, the broad concept of the present invention includes any number of such guard tines coupled by various of the aforementioned cross members, or bars, so as to form a unitary, integral hold-down sickle guard. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A one-piece hold-down sickle guard for cooperating with a plurality of reciprocating sickle sections positioned on a cutterbar of a cutting implement and forming a plurality of cutting surfaces therewith and for protecting said sickle sections from damage, said hold-down sickle guard comprising:

a plurality of longitudinally extending guard members each including an upper body section and a lower body section in spaced relation so as to define a horizontal slot therebetween within which a respective sickle section is confined and freely movable, said upper and lower body sections coupled at respective forward portions thereof so as to form an integral guard member and wherein said lower body portions form cutting surfaces with immediately adjacent sickle sections;

mounting means coupled to an aft portion of said guard members for securely coupling said guard members to a cutterbar of said cutting implement; and hold-down means formed into an aft portion of the upper body section of each of said guard members said hold-down means including a hold-down bar having a portion thereof projecting toward said lower body section of said guard member to provide a depressed area, with said depressed area for engaging and displacing the reciprocating sickle sections toward the corresponding lower body section of said guard member so as to maintain a predetermined cutting cooperation and clearance between said sickle sections and said sickle guard.

2. A hold-down sickle guard as in claim 1 wherein said hold-down means includes a hold-down bar coupled to and extending between the aft portions of adjacent guard members.

3. A hold-down sickle guard as in claim 2 wherein said hold-down bar includes first and second end portions projecting toward a lower body section of said guard member to provide depressed areas, with said depressed areas engaging and displacing downward the reciprocating sickle sections.

4. A hold-down sickle guard as in claim 1 wherein said hold-down bar includes turned down portions of the aft ends of each of the upper body sections of said guard members, which turned down portions each provide a depressed area for engaging and displacing an immediately adjacent sickle section toward a corresponding lower body section.

5. A hold-down sickle guard as in claim 1 wherein said mounting means includes a mounting flange integral with an aft portion of each guard member.

6. A hold-down sickle guard as in claim 1 wherein said cutting surfaces are serrated.

7. A hold-down sickle guard as in claim 1 further including coupling means for connecting each of said mounting means coupled to an aft portion of each of said guard members.

8. A hold-down sickle guard as in claim 7 wherein said coupling means includes a crossbar connected at each end thereof to the mounting means of each of said guard members.

9. A hold-down sickle guard as in claim 1 further including a trash bar coupling the respective lower body sections of adjacent guard members for preventing foreign matter from entering between a sickle section and said sickle guard.

10. A hold-down sickle guard as in claim 9 wherein said trash bar is positioned immediately below said hold-down means with the reciprocating sickle sections positioned between said trash bar and said hold-down means.

* * * * *

UNITED STATES PATENT AND TRADEMARK OFFICE
CERTIFICATE OF CORRECTION

PATENT NO.   :   4,519,192

DATED        :   May 28, 1985

INVENTOR(S)  :   Fred H. Oppenhuisen and Frank O. Allee

It is certified that error appears in the above-identified patent and that said Letters Patent is hereby corrected as shown below:

Column 4, line 7 delete "or", insert --of--;

Column 8, line 8 delete "of", insert --on--.

Signed and Sealed this

Twentieth Day of August 1985

[SEAL]

Attest:

DONALD J. QUIGG

Attesting Officer

Acting Commissioner of Patents and Trademarks